United States Patent [19]

Heimberger

[11] 4,352,654
[45] Oct. 5, 1982

[54] APPARATUS FOR THE PRODUCTION OF SMALL SYNTHETIC RESIN ARTICLES

[75] Inventor: Helmut Heimberger, Steinhausen, Switzerland

[73] Assignee: Optilon W. Erich Heilmann GmbH, Cham, Switzerland

[21] Appl. No.: 218,816

[22] Filed: Dec. 22, 1980

[30] Foreign Application Priority Data

Dec. 22, 1979 [DE] Fed. Rep. of Germany ....... 2951978

[51] Int. Cl.³ ................................................ B29D 5/00
[52] U.S. Cl. ...................................... 425/545; 264/166;
264/297; 264/318; 264/328.8; 264/328.11;
425/556; 425/572; 425/575; 425/588; 425/329;
425/371
[58] Field of Search ............... 264/166, 297, 167, 216,
264/261, 318, 328.8, 212, 328.11; 425/325, 327,
329, 371, 324.1, 572, 575, 588, 545, 556

[56] References Cited

U.S. PATENT DOCUMENTS

| | | | |
|---|---|---|---|
| 3,020,587 | 2/1962 | Alderfer et al. | 264/166 |
| 3,196,196 | 7/1965 | Burbank | 264/167 |
| 3,462,795 | 8/1969 | Hermanns | 425/371 |
| 3,608,035 | 9/1971 | Frohlich | 264/166 |
| 3,758,657 | 9/1973 | Menzin et al. | 264/166 |
| 3,999,924 | 12/1976 | Tanaka | 425/324.1 |
| 4,050,873 | 9/1977 | Brumlik et al. | 425/371 |
| 4,096,225 | 6/1978 | Kowalski | 264/167 |
| 4,176,149 | 11/1979 | Moertel | 264/166 |
| 4,230,657 | 10/1980 | Haack et al. | 425/324.1 |
| 4,268,474 | 5/1981 | Moertel | 264/297 |

FOREIGN PATENT DOCUMENTS 1504105 8/1969 Fed. Rep. of Germany ...... 425/325

*Primary Examiner*—Jeffery R. Thurlow
*Attorney, Agent, or Firm*—Karl F. Ross

[57] ABSTRACT

An apparatus for producing small molded bodies with overhanging portions, e.g. for use as end stop members in slide fastener stringers, wherein a molding band is fed to a forming wheel to define individual molding cavities therewith, the cavities passing to a molding station at which a synthetic resin material is injected into the cavities. According to the invention, the band consists of a plurality of band members which upon being fed to the wheel, form a core with undercut formations around which the synthetic resin material is molded and, following molding, the band portions are laterally or orthogonally offset to release the articles drawn by the band out of forming beds on the wheel.

5 Claims, 12 Drawing Figures

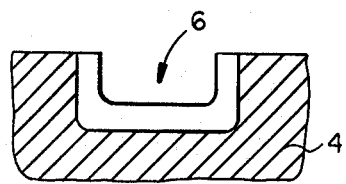
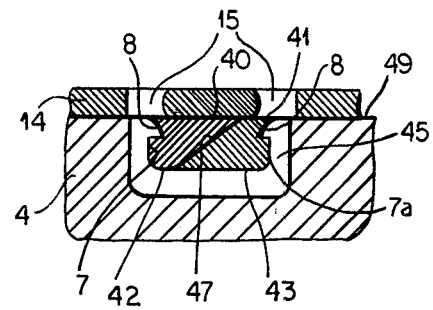
FIG.2  FIG.3
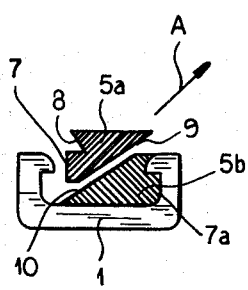
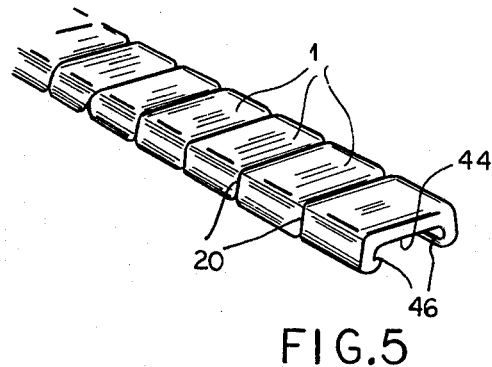
FIG.4  FIG.5
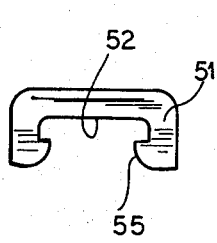
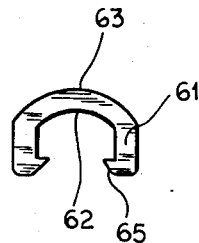
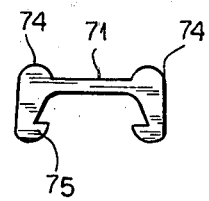
FIG.6  FIG.7  FIG.8

APPARATUS FOR THE PRODUCTION OF SMALL SYNTHETIC RESIN ARTICLES

FIELD OF THE INVENTION

My present invention relates to an apparatus for producing small synthetic resin articles and, more particularly, to the mass production of small molded articles having overhanging parts and especially objects which can be used as end-stop members in slide-fastener stringers.

BACKGROUND OF THE INVENTION

In the slide-fastener field a stringer generally comprises a pair of support tapes to which coupling elements are applied along confronting edges, these coupling elements having a multiplicity of coupling heads which interdigitate upon movement of a slider along the rows of coupling heads. The coupling heads may be individual members clamped upon or molded on the respective edge of the tape or can form part of a continuous coupling element in the form of a coil or meander which is also affixed to the tape, e.g. by being woven or knitted in place or being held in place by rows of stitching with or without textile or other beads or strands which can also extend through continuous coupling elements.

Slide-fastener stringers can be of the closed type or of the separable type. In the closed-type of stringers, the coupling elements at least at one end of the slider path are joined together by an end-stop member which can have a U-configuration and can bridge the two tapes or slide fastener halves. In fully or partially separable slide-fastener stringers, one or both ends of each stringer half can be formed with an end-stop member intended to block withdrawal of the slider. Other end-stop members have been used, e.g. with a plug-and-socket configuration, to allow insertion of one end of a stringer half into a slider positioned by the end-stop member on the corresponding end of the other stringer half so that movement of the slider can then bring about interdigitation of the coupling heads.

Thus it will be apparent that, especially for slide-fastener stringers, end-stop members of various sizes and configurations may be required.

In early slide-fastener stringers, such end-stop members were almost invariably composed of metal, e.g. stamped with a U-configuration so that the legs of the U could be clamped or clenched about the edge of the tape. More recently slide fastener stringers have made use of coupling heads composed of synthetic resin material and it is frequently desirable to provide end-stop members which also are composed of synthetic resin material, especially thermoplastics, and formed by molding.

It is known to produce molded articles utilizing a forming wheel which is provided with spaced-apart beds, each of which can cooperate with an opening in an endless forming band to define a mold cavity when the band is fed to the periphery of the wheel. As the wheel continues to rotate, the mold cavity is brought into registry with a source of the synthetic resin, e.g. injection molding head, and upon hardening of the synthetic resin within the mold cavity the article is drawn away from the bed as the band leaves the periphery of the wheel to enable the articles to be recovered.

In apparatus of this type the band passes around at least one roller spaced from the wheel, meets the wheel tangentially, is slung around a portion of the wheel, and leaves the wheel tangentially to return to the roller in its closed path.

It is frequently desirable to provide small synthetic resin articles of the aforedescribed type which have overhanging portions, i.e. which are molded at least in part around a core. With prior art techniques and the aforementioned band-and-wheel arrangement it has generally not been possible to produce molded articles of such shapes because the articles could not be released from the band.

It has been proposed to solve the problem in part by molding the articles around cords or strands which are fed between the band and the wheel so that the articles are drawn out of the beds by such strands rather than by the band itself. While this technique is advantageous if the articles and the strand must remain together for further processing, the technique is undesirable if separation of the articles from the strand may be required.

In another technique, the band and/or the wheel are designed to form the articles so that they are bridged by synthetic resin webs or strips, e.g. in a ladder arrangement. This of course has the disadvantage that the excess material must frequently be removed in additional steps and with other apparatus.

The most common alternative has been to design the articles so that they are free from overhanging portions. However, it is frequently desirable to mass produce articles with such overhangs and without coupling the articles together during molding either by strands, which are molded into the articles, or by ladder arrays of strips or the like.

OBJECTS OF THE INVENTION

It is, therefore, the principal object of the present invention to provide an improved apparatus for the mass production or serial production of small synthetic resin articles whereby the disadvantages of earlier systems are avoided.

Another object of the invention is to provide an improved apparatus for the serial molding of small synthetic resin articles having overhanging portions but without requiring the coupling of the articles together to withdraw them from the forming beds.

It is yet another object of this invention to simplify the production of small synthetic resin articles, including articles which may be coupled together at intentional-break zones which themselves will not withstand the forces necessary to withdraw the articles from the forming beds of a forming wheel.

SUMMARY OF THE INVENTION

These objects and others which will become apparent hereinafter are attained, in accordance with the present invention, with an apparatus of the type described comprising a wheel having form beds and a band passing along a portion of the periphery of said wheel and defining mold cavities with the wheel which successively register with a feed device for the synthetic resin material, e.g. an injection molding head. According to the invention, the forming band comprises a plurality of partial bands which move in parallel and have at least portions which are received in the bed or beds of the wheel to form displacement members adapted to constitute a core around which the synthetic resin material is molded so that the molded articles can have overhanging portions, i.e. portions overhanging the displacement members.

The overhanging portions enable the molded bodies to be withdrawn from the form beds as the composite band is directed away from the periphery of the wheel, whereupon the partial bands can be offset from one another to withdraw the respective displacement members from the articles and free the latter from the band.

Naturally, the articles are withdrawn from the form beds only when they have cooled or set sufficiently that the offsetting of the band parts and release of the articles will not cause further deformation. The operating parameters of the device, e.g. the speed thereof, can be adjusted accordingly.

In the system of the present invention, the forming band thus performs several functions. For example, it defines with the form beds of the wheel the molding cavity and, in addition, provides a core within the form beds about which the articles can be formed so that the articles can have a concave or hollow configuration. In addition, the band provides the means whereby the articles are withdrawn from the form beds, and finally, constitutes the means whereby the articles may be deposited, e.g. in a receptacle, preferably individually so that they need not be subsequently separated from one another although, as noted above, strands of synthetic resin interconnecting the articles can remain and this mode of operation is not excluded by the present invention.

Embedded strands which hitherto have been required to remove the articles from the form beds are no longer required.

The multiple band technique, whereby two or more endless members form a common band around the periphery of the wheel but can be mutually offset upon leaving the wheel to release the articles, permits the individual band members to be formed with undercuts or the like so that the articles can have relatively complex overhanging portions of a type which could not readily be provided in wheel-molded articles hitherto. The articles effectively straddle the composite band during the removal operation and only thereafter are the articles released from the band. The offsetting can be effected continuously by displacing a stretch of one of the band members out of the plane of the stretch of another band member, preferably laterally.

According to a feature of the invention, the composite band is formed from two endless band members whose displacement portions are coplanar in the beds of the wheel but which abut along inclined planes so that these members can be shifted relatively transversely to one another, i.e. along the inclined planes which form an inclined separation joint.

While particular configurations of the band which have been found to be effective are described below for forming end-stop members and similar articles of different shapes, it will be understood that still other configurations are possible. For example, the composite band may be composed of three or more band members and the displacement portions can be provided with abutting surfaces which extend or are separable orthogonally to the composite band place and/or abut one another in a wedge-like manner so that the abutment surfaces can adjoin one another and nevertheless be relatively shiftable.

This embodiment is scarcely more complicated than the other embodiments described and is as reliable while permitting the variety of configurations of articles to be molded to be increased.

To permit offsetting or relative shifting of the band members, the latter are passed over different deflection rolls which are separated from one another and can be spatially offset as well.

According to yet another feature of the invention, a cover band is provided which has injection openings corresponding to the forming beds and which is introduced between the composite forming band and the injection head.

The system described allows the continuous or serial production of small synthetic resin articles by injection molding processes with individual recovery of the articles and without the need for the threads or cords which had previously to be embedded therein.

BRIEF DESCRIPTION OF THE DRAWING

The above and other objects, features and advantages of the present invention will become more readily apparent from the following description, reference being made to the accompanying drawing in which:

FIG. 2 is a detail view, in section along the line II—II of FIG. 1 and drawn to an enlarged scale, showing a form bed in the wheel of the apparatus of FIG. 1;

FIG. 3 is a view similar to FIG. 2 but taken along the line III—III of FIG. 1 showing the relationship of the composite forming band and a cover band to the form beds of the wheel;

FIG. 4 is a detail section along the line IV—IV of FIG. 1 illustrating the offsetting band members of the composite forming band;

FIG. 5 is a perspective view in the same scale as FIGS. 2-4 showing a row of articles produced in accordance with the present invention, joined only by weak intentional-break zones;

FIGS. 6, 7 and 8 are end views of articles of other configurations which can be produced in accordance with the present invention;

SPECIFIC DESCRIPTION

Figure 1:
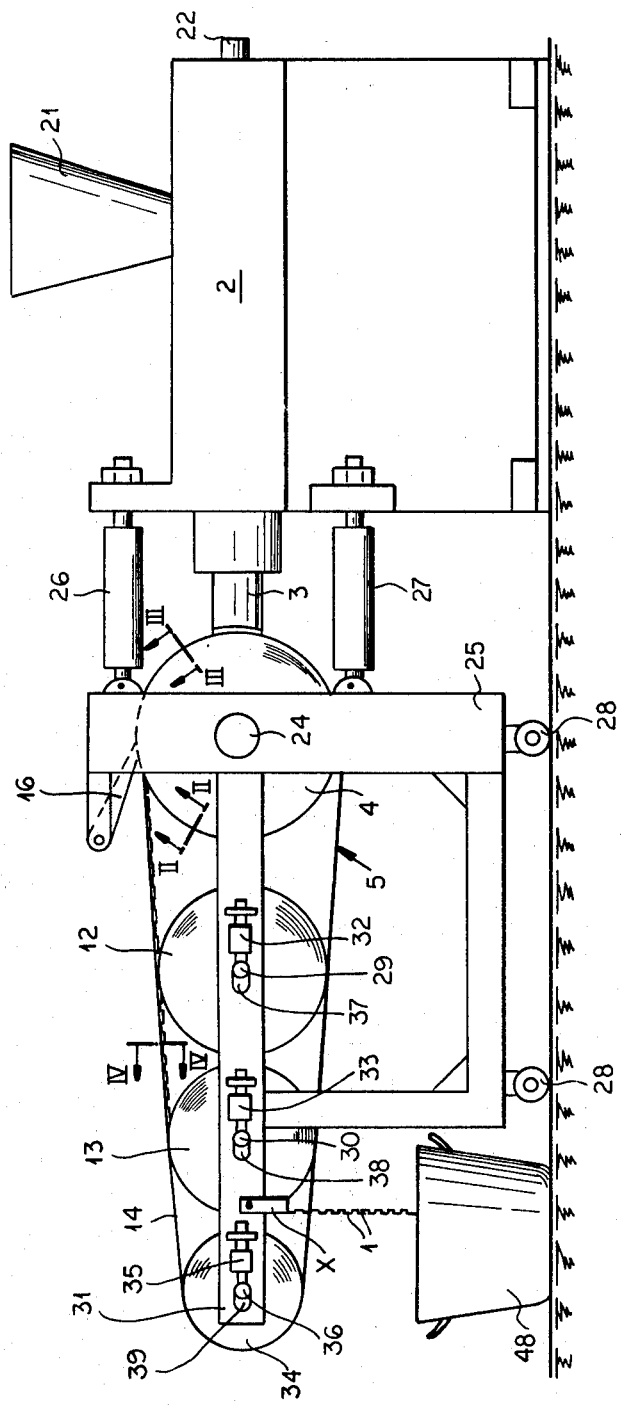
FIG. 1 is a diagrammatic side-elevational view of an apparatus in accordance with the present invention.

As FIGS. 1 through 4 and 12 show, the apparatus for producing synthetic resin articles 1 (FIG. 5), which can be interconnected only by intentional-break zones 20 and can be used as end-stop members for a slide-fastener stringer, can comprise a synthetic resin extrusion press 2 of the worm type, to which the pulverulant thermoplastic material is fed by a funnel 21 and in which it is plastified by a worm 22 before being fed to an injection head 3.

Juxtaposed with this injection head 3 is a forming wheel 4 provided with forming beds 6 which can be interconnected at 23 so that the synthetic resin articles are joined at the intentional-break zones, this wheel being mounted for rotation on a shaft 24 of a support frame 25 and being driven by a motor or the like (not shown) at a rate such that the molded articles are sufficiently hardened as they leave the head 3 to be withdrawn from the beds 6 by the composite endless forming band which is generally represented at 5.

The position of the wheel relative to the head 3 can be adjusted by a pair of cylinders 26, 27 acting upon the frame 25 which is displaceable toward and away from the head on wheels 28.

The composite forming band 5 is provided with formations as described below which are received in the beds 6 and define mold cavities therein into which the synthetic resin material is injected for hardening into the articles 1.

The composite band, in this embodiment, comprises two endless band members 5a, 5b which pass over respective wheels 12 and 13 each journaled on a shaft 29, 30 between bars 31 on the support carriage 25 and individually tensioned by adjusting screw assemblies 32, 33.

The cover band 14 which passes over yet another wheel 34 adjustable by the screw arrangement 35, the shafts 29, 30 and 36 of the wheels 12, 13 and 14 being shiftable in respective slots 37, 38, 39 to that end.

As can be seen from FIGS. 3 and 4, the composite band 5 is formed by the two endless band members 5a and 5b which are formed respectively with displacement portions 7 and 7a below undercuts 8. When the two band members are slung around the wheel (FIG. 3) the upper surfaces 40 and 41 of these members and the lower surfaces 42, 43 lie flush with one another and the displacement portions 7, 7a form a core defining the interior cavity 44 of the molded articles 1 and impart a corresponding shape to the mold cavity 45 in the bed 6. The undercuts 8 generate overhangs 46 in the finished article whereby the article (FIG. 4) can be lifted from the bed.

The band members 5a, 5b abut along inclined planes 9 and 10 to form a joint 47 and by lateral offsetting of the member 5a relative to member 5b generally parallel to this joint in the direction of arrow A (FIG. 4) which has both a horizontal and a vertical component, the members 1 are released to drop into a receptacle 48 (FIG. 1).

As is also apparent from FIGS. 1 and 3, the cover band 14 lies along the periphery 49 of the wheel 4 and thus covers the surfaces 40, 41 while being provided with orifices 15 through which the synthetic resin material is injected into each cavity 45.

FIGS. 6, 7 and 8 show other configurations of the article which can be formed at 51, 61 and 71, respectively. The article 51 has a shallower cavity 52 than the end-stop member 1 previously described. The article 61, however, has a rounded base 63 with a correspondingly shaped relatively deep cavity 62 whereas the article 71 has relatively massive protuberances 74 on its base. In each embodiment, overhangs 55, 65, 75 can be provided.

Figure 9:
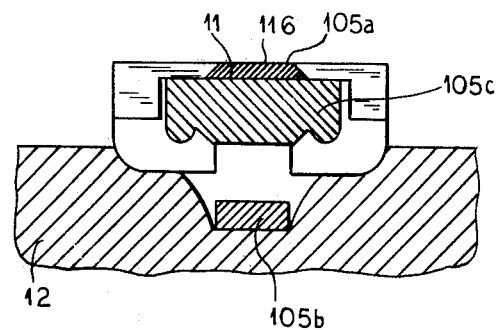
FIGS. 9, 10 and 11 are sectional views similar to FIGS. 3 and 4 illustrating other embodiments of the invention.
Figure 10:
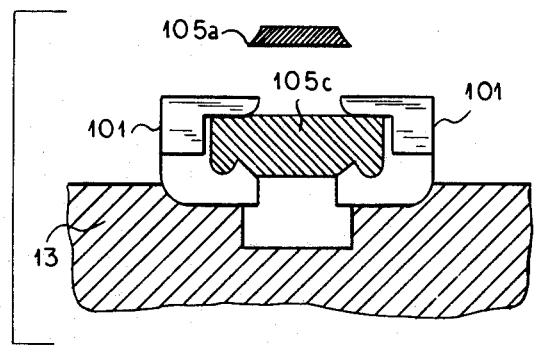
Figure 11:
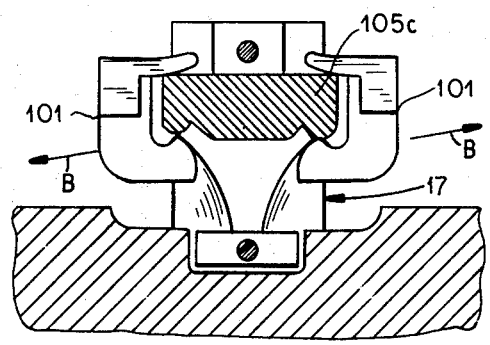
Figure 12:
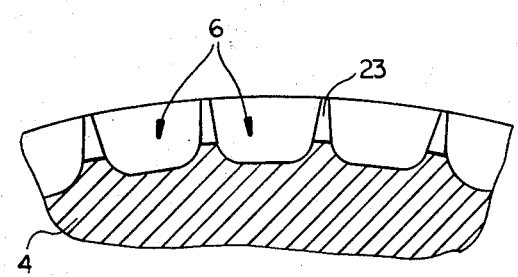
FIG. 12 is a section through a forming wheel as used in the apparatus of FIG. 1 but drawn to a larger scale.

The embodiment of FIGS. 9 through 11 forms the composite band of three band members 105a, 105b and 105c with displacement formations which adjoin at surfaces 11 which are orthogonal to the band plane or form a wedge configuration therewith so that the individual molded articles 101 can be released by withdrawing the member 105a initially. A stripper 16 can shave any excess material from the surface 116 in this embodiment in which the cover strip is not shown. The band 105a passes over the deflecting wheel 12 and returns to the forming wheel 4 whereas the outer band part 105b returns to the forming wheel over deflecting roller 13.

The articles left on band member 105c, of course, can be stripped in the region X (FIG. 1) by a laterally held wedge member 17 or by a wedge member supported on cables or wires. The members 101, here deflected laterally in the direction of arrows B can then fall into the container in the manner described. This embodiment has been found to be particularly effective for end-stop members of the type used to draw the slider onto a row of coupling elements (starting members).

I claim:

1. An apparatus for producing a succession of small molded articles, especially end-stop members for slide fasteners, comprising:

a form wheel provided with a multiplicity of forming beds distributed around the periphery of said wheel;

a composite forming band having a plurality of endless band members meeting along the periphery of said wheel and extending around a portion of said periphery before being deflected away from the periphery of said wheel said band members collectively defining at each of said beds along said portion of the periphery of said wheel a respective generally closed core surrounded by a respective individual mold cavity having the shape of the articles to be molded, at least two of said endless band members being formed with undercuts whereby said articles have overhangs enabling said articles to be withdrawn by said composite band from said beds as said members are drawn away from said wheel;

means including an injection molding head juxtaposed with said portion of the periphery of said wheel for introducing synthetic resin into said cavities; and means for mutually offsetting said members passage therefrom away from said wheel and upon the withdrawal of said articles by the composite band from said bed to release said articles from said composite band.

2. The apparatus defined in claim 1 wherein said composite band comprises two of said endless band members having displacement portions received in said beds and forming cores in said cavities, said displacement portions adjoining along an inclined plane, said members mutually offset by relative movement along said plane.

3. The apparatus defined in claim 1 wherein at least three band members form said composite band and adjoin along surfaces substantially orthogonal to the band plane, said composite band being separated at least in part by movement of said band members transverse to the band plane.

4. The apparatus defined in claim 1, claim 2 or claim 3, further comprising a cover band guided onto said wheel and along said portion of said periphery while being formed with openings communicating with said cavities.

5. The apparatus defined in claim 4 wherein said offsetting means includes respective rollers around which each of said band members is guided prior to returning to said wheel.

* * * * *